United States Patent
Dorenbosch et al.

(10) Patent No.: US 7,536,186 B2
(45) Date of Patent: May 19, 2009

(54) SYSTEM TO IMPROVE HANDOVER BEHAVIOR

(75) Inventors: Jheroen P. Dorenbosch, Paradise, TX (US); Anatoly S. Belkin, Glenview, IL (US); Zaffer S. Merchant, Parkland, FL (US); Alex P. Hirsbrunner, Bloomingdale, IL (US)

(73) Assignee: Motorola, Inc., Schaumburg, IL (US)

( * ) Notice: Subject to any disclaimer, the term of this patent is extended or adjusted under 35 U.S.C. 154(b) by 820 days.

(21) Appl. No.: 10/649,999

(22) Filed: Aug. 26, 2003

(65) Prior Publication Data

US 2005/0048977 A1 Mar. 3, 2005

(51) Int. Cl.
*H04Q 7/20* (2006.01)
*H04M 1/00* (2006.01)

(52) U.S. Cl. ............ 455/440; 455/436; 455/437; 455/438; 455/439; 455/441; 455/442; 455/552.1; 455/553.1; 370/331; 370/332; 370/333

(58) Field of Classification Search ......... 455/436–444, 455/552, 552.1, 553.1; 370/331–333
See application file for complete search history.

(56) References Cited

U.S. PATENT DOCUMENTS

| | | | |
|---|---|---|---|
| 5,239,667 A | 8/1993 | Kanai | |
| 5,796,727 A | 8/1998 | Harrison et al. | |
| 5,873,033 A | 2/1999 | Hjern et al. | |
| 6,381,463 B1 | 4/2002 | Tu et al. | |
| 6,385,460 B1 | 5/2002 | Wan | |
| 6,473,038 B2 | 10/2002 | Patwari et al. | |
| 6,496,695 B1 | 12/2002 | Kouji et al. | |
| 6,509,830 B1 | 1/2003 | Elliott | |
| 6,714,785 B1 * | 3/2004 | Han ........................... | 455/440 |
| 6,766,160 B1 | 7/2004 | Lemilainen et al. | |
| 6,771,963 B1 * | 8/2004 | Cheng et al. ................ | 455/437 |
| 2002/0085540 A1 | 7/2002 | Hyvarinen et al. | |

(Continued)

FOREIGN PATENT DOCUMENTS

EP WO0067514 A1 11/2000

(Continued)

OTHER PUBLICATIONS

Fuhrmann et al, "BlueWand: A Versatile Remote Control and Pointing Device", University of Karlsruhe, Germany, 2002. http://www.computer.org/csidc/2002ProjectReport/Karlsruhe-final.pdf.

(Continued)

*Primary Examiner*—Lester Kincaid
*Assistant Examiner*—Daniel Lai

(57) ABSTRACT

A system, computer readable medium, mobile subscriber device and method determine that the device (306), operating on a first communications system is detecting a triggering event, which may be the detection of a wireless local area network border cell (210) or a degradation in signal quality. The device (306) then initiates a registration sequence with a second wireless communication system if the device (306) has detected the triggering event, determines the speed and/or displacement of the device (306), and conducts any present and subsequent calls via the second wireless communication system if the speed and/or displacement of the device exceeds a predetermined threshold. The registration sequence may be aborted if at least one of the speed and displacement of the device (306) does not exceed predetermined thresholds. Movement of the device (306) may be determined by an accelerometer (314) or GPS chipset.

4 Claims, 8 Drawing Sheets

U.S. PATENT DOCUMENTS

| | | |
|---|---|---|
| 2002/0147008 A1 | 10/2002 | Kallio |
| 2002/0160785 A1 | 10/2002 | Ovesjo et al. |
| 2003/0109258 A1* | 6/2003 | Mantyjarvi et al. ......... 455/440 |
| 2003/0119481 A1 | 6/2003 | Haverinen et al. |
| 2003/0134635 A1 | 7/2003 | Sundar et al. |
| 2003/0134650 A1 | 7/2003 | Sundar et al. |
| 2003/0153312 A1* | 8/2003 | Lee et al. .................... 455/436 |
| 2003/0174667 A1 | 9/2003 | Krishnamurthl et al. |
| 2004/0114553 A1 | 6/2004 | Jiang et al. |
| 2004/0121774 A1* | 6/2004 | Rajkotia et al. ............. 455/441 |
| 2004/0137902 A1 | 7/2004 | Chaskar et al. |
| 2004/0151139 A1 | 8/2004 | Li et al. |
| 2004/0170122 A1 | 9/2004 | Guo et al. |
| 2004/0176024 A1 | 9/2004 | Hsu et al. |
| 2004/0192211 A1 | 9/2004 | Gallagher et al. |
| 2004/0203789 A1* | 10/2004 | Hammond et al. .......... 455/440 |
| 2005/0079864 A1 | 4/2005 | Johnson et al. |

OTHER PUBLICATIONS

USPTO Non-Final Office Action Dated Oct. 18, 2004 for U.S. Appl. No. 10/649,756 - 16 pages.

PCT International Search Report for Application No. PCT/US04/25796, dated Nov. 2, 2004 - 8 pages.

USPTO Final Office Action dated Apr. 26, 2005 for U.S. Appl. No. 10/649,756 - 18 pages.

USPTO Non-Final Office Action dated Jul. 25, 2005 for U.S. Appl. No. 10/649,756 - 22 pages.

USPTO Final Office Action dated Dec. 15, 2005 for U.S. Appl. No. 10/649,756 - 23 pages.

* cited by examiner

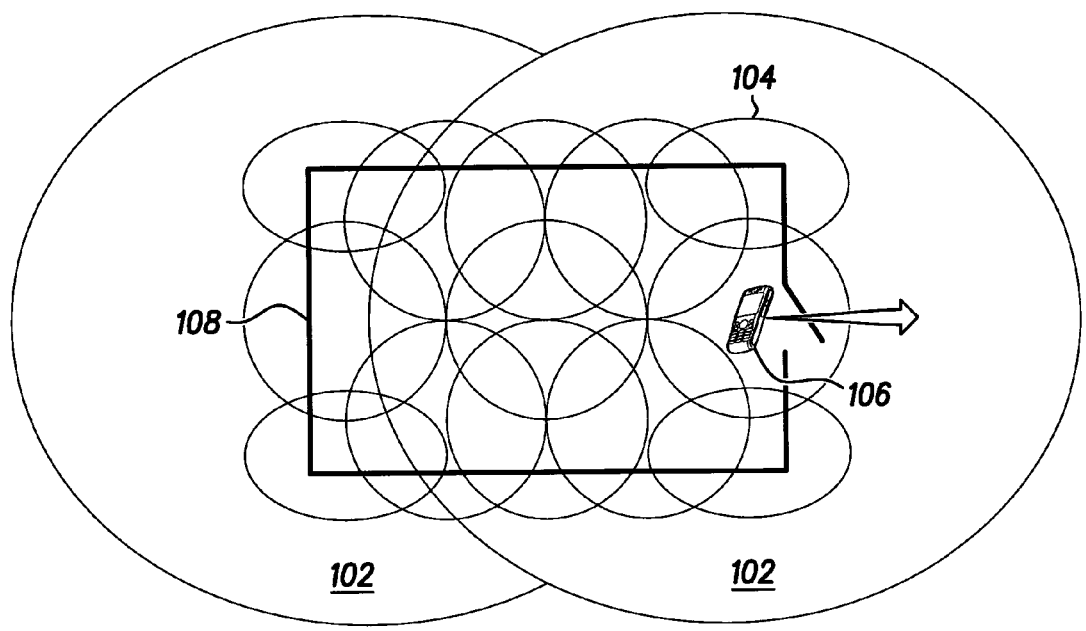
- PRIOR ART - FIG. 1
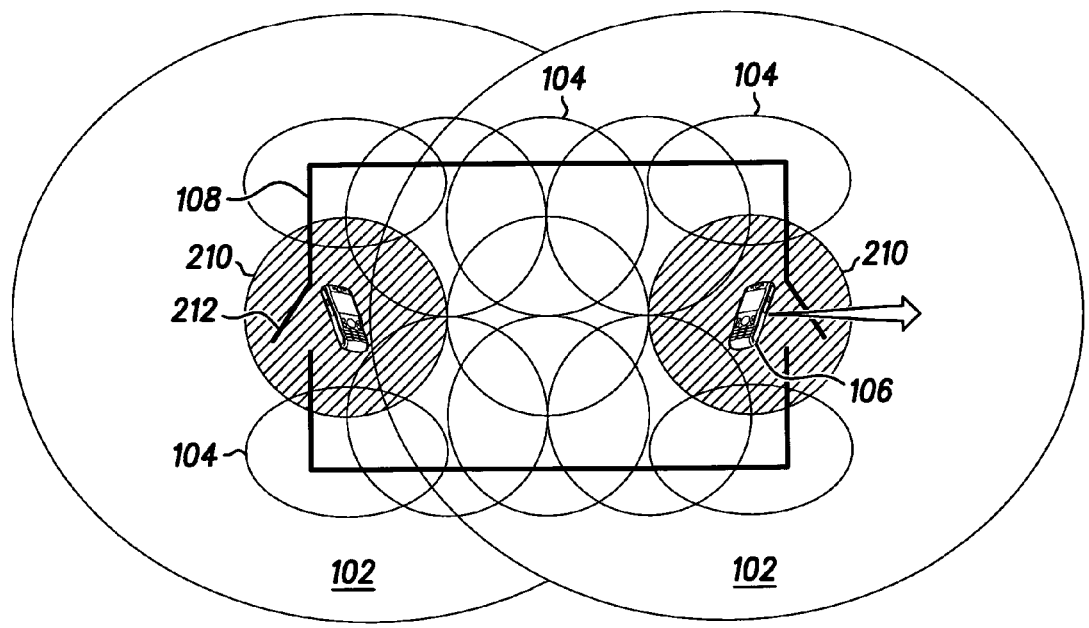
- PRIOR ART - FIG. 2

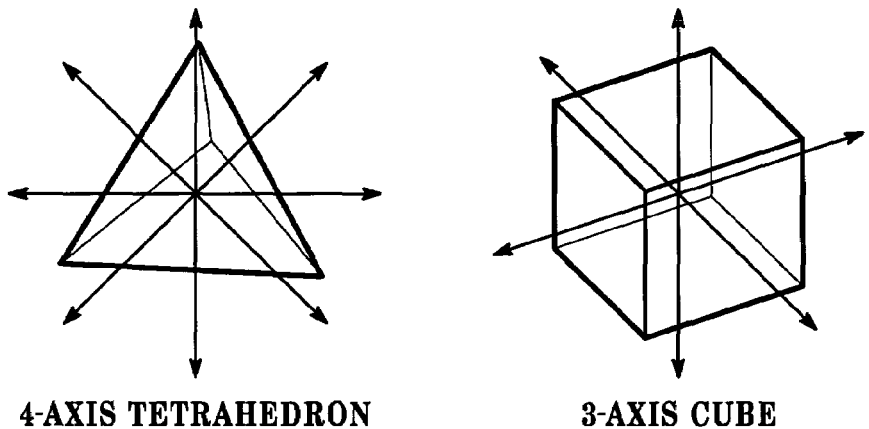
4-AXIS TETRAHEDRON   3-AXIS CUBE
FIG. 6
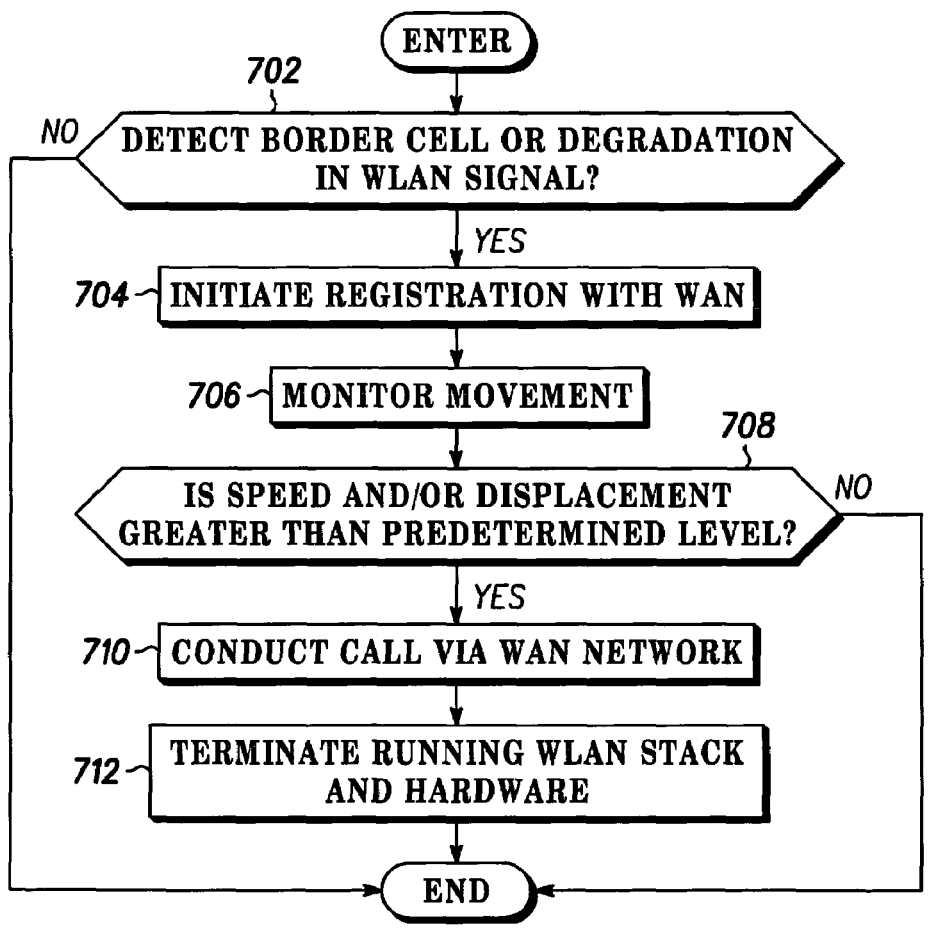
FIG. 7  *700*

SYSTEM TO IMPROVE HANDOVER BEHAVIOR

CROSS-REFERENCE TO RELATED APPLICATION

The present patent application is related to co-pending and commonly owned U.S. patent application No. 2005/0048972-A1, entitled "SYSTEM AND METHOD TO IMPROVE WLAN HANDOVER BEHAVIOR AT ENTRY/EXIT POINTS", filed on even date with the present patent application, the entire teachings of which being hereby incorporated by reference.

FIELD OF THE INVENTION

The present invention generally relates to the field of wireless communications, and more particularly relates to a system and method to improve handover and registration behavior between WLANs and WANs and battery life of a mobile device when a user is stationary in border cells.

BACKGROUND OF THE INVENTION

Many cellular communication systems consist of a combination of different types of systems and protocols. Likewise, many of the devices used on these networks, such as cellular telephones and handheld personal data assistants, are designed to be multi-mode devices, i.e. will operate on multiple networks. Ideally, there should be no degradation or otherwise negative indication that a device is on one network or another to an end user. However, certain factors do affect performance on different networks. Battery life may be degraded on one system in comparison to another as the hardware required to operate in that particular mode may consume more energy than in another mode. Also, cost may be significantly different from one system to another and the subscriber may pay a premium to be able to use a particular network.

Many locations, such as workplaces and universities, are beginning to deploy wireless local area networks (WLANs) within a particular site or building. For these systems, devices having multi-mode operation will operate on the WLAN while within the building or site and switch over to a macro or wide area network (WAN), such as a GSM (Global System for Mobile communications), CDMA (Code Division Multiple Access (CDMA), iDEN (integrated Digital Enhanced Network) or TDMA (Time Division Multi-Access) cellular system, when the user leaves the coverage area of the WLAN. While on the WLAN system, calls are made using Voice-over-IP which provides a great cost savings for both the user and the cellular system.

In order for this multi-mode system to be effective, it is desirable to have a seamless integration between systems. It is critical to be able to transfer a call in progress on one system over to a different system without a noticeable consequence to the end user, such as a lost call, an unnecessary charge, significant reduction in battery life, etc. In most instances, the burden to decide when to hand over to the other system is placed upon the actual subscriber device.

Several techniques exist for making the handover decision. The first, most obvious method is a "brute force" method as illustrated in FIG. 1. A typical cellular communications system consisting of overlapping WAN cells 102, with a concentration of overlapping WLAN cells 104 within a building 108 is shown. While within the area of WLAN coverage, the mobile subscriber device 106 is continually running the hardware and software stack for both systems. This insures that whenever the user leaves coverage of the WLAN system, the call is handed over to the WAN system with no noticeable interruption to the user. The problem with this method is that there is significant detrimental effect on battery life because the device must operate both sets of hardware simultaneously. Moreover, there is an inherent degradation in battery life of these devices in comparison to single-mode devices due to the additional current drain required by the WLAN chipsets. While there may be a cost savings for calls made on the WLAN system, this advantage is offset by the loss in battery life.

A prior art system that uses a more intelligent handover method is shown in FIG. 2. In this example, border cells 210 are placed near the entry and exit doors 212 of the building 108. A border cell 210 generally consists of a WLAN cell with an access point (AP) in the vicinity of an entry and/or exit point 212. These APs have been designated as border cell 210 APs. A border cell AP transmits information to the subscriber unit (SU) 106 that identifies its cell as a border cell 210. Normally, before a user is leaving the WLAN coverage area 104, the user's SU first detects a border cell 210. The SU 106 starts the cellular stack and begins to register with the cellular network 102 upon detecting the border cell 210 information so that the call is handed over in an adequate timeframe. By the time the SU 106 is out of range of the WLAN coverage area 104, the call should be transferred to the WAN 102.

When a user is leaving the WLAN coverage 104, the decision to hand over from the WLAN 104 to the macro network or WAN 102 needs to be made early enough to avoid dropping calls due to the rapid falloff of WLAN coverage. Additionally, the handover decision must not be made prematurely to avoid the service cost associated with handing over a subscriber to the macro network 102 when the SU 106 does not actually leave the WLAN coverage area 104. Similarly, users on calls while exiting the building or taking breaks near the entryways (e.g. smoking near exits in WLAN coverage areas 104), should not be mistakenly handed over to the WAN 102.

SUMMARY OF THE INVENTION

Briefly, in accordance with preferred embodiments of the present invention, disclosed are a system, method and computer readable medium for improving WLAN handover behavior and phone battery life when a user is stationary in border cells. In accordance with a first preferred embodiment of the present invention, a system, computer readable medium, mobile subscriber device operating in a first wireless communication system and method determine that the mobile subscriber device is detecting a triggering event. The triggering event may be the detection of a wireless local area network border cell or the detection of a degradation in signal quality. The method then initiates a registration sequence with a second wireless communication system if the device is detecting the triggering event, determines the speed and/or displacement of the device, and conducts present and subsequent calls via the second wireless communication system if the speed and/or displacement of the device exceed predetermined thresholds.

Additionally, a second preferred embodiment may abort the cell handover process if at least one of the speed and displacement of the wireless device does not exceed predetermined thresholds. Movement of the wireless device may be determined, for example, by an accelerometer or GPS chipset. The accelerometer preferably detects movement across at least three axes.

A third preferred embodiment of the invention may handover calls from a wireless local area network (WLAN) to a wide area network (WAN), or vice versa. The WLAN may use protocols such as IEEE Standard 802.11 or Bluetooth. The WAN may use protocols such as those used in cellular systems such as code division multiple access (CDMA), time division multiple access (TDMA), global system for mobile communications (GSM) and integrated digital enhanced network (iDEN).

An alternative embodiment monitors the speed and displacement of the wireless device before initiating the handover process, and begins the sequence only if the speed and/or displacement exceed the predetermined thresholds.

The preferred embodiments of the present invention are advantageous because they allow the wireless device to make a more intelligent decision whether to handover a call to another network based on the actual movement of the wireless device. This prevents unnecessary loads on a WAN system, thereby saving cost and increasing the battery life of the device. The benefits are especially noticed by users who spend prolonged periods of time in border cell areas; without the invention, the wireless devices would have to run both a WLAN stack and a cellular (WAN) stack simultaneously.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 is a block diagram illustrating a typical prior art wireless communications system incorporating overlapping WAN cells and WLAN cells.

FIG. 2 is a block diagram illustrating a typical prior art wireless communications system incorporating overlapping WAN cells, WLAN cells, and border WLAN cells at building entry points.

FIG. 6 is an illustration depicting a 4-axis accelerometer geometry used in the movement-detecting mobile communication device of the system of FIG. 3 according to a preferred embodiment of the present invention. Also, FIG. 6 shows a 3-axis accelerometer geometry for comparison with the 4-axis accelerometer geometry.

FIGS. 7, 8, 9, 10 and 11 are operational flow diagrams illustrating portions of a handover process between a WLAN and a WAN according to a preferred embodiment of the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to a preferred embodiment, advantageously overcomes problems with the prior art by proposing the detection of movement of a mobile communications device through a WLAN border cell to initiate the process of handing over a mobile communications device from one system to another, as will be discussed below.

Figure 3:
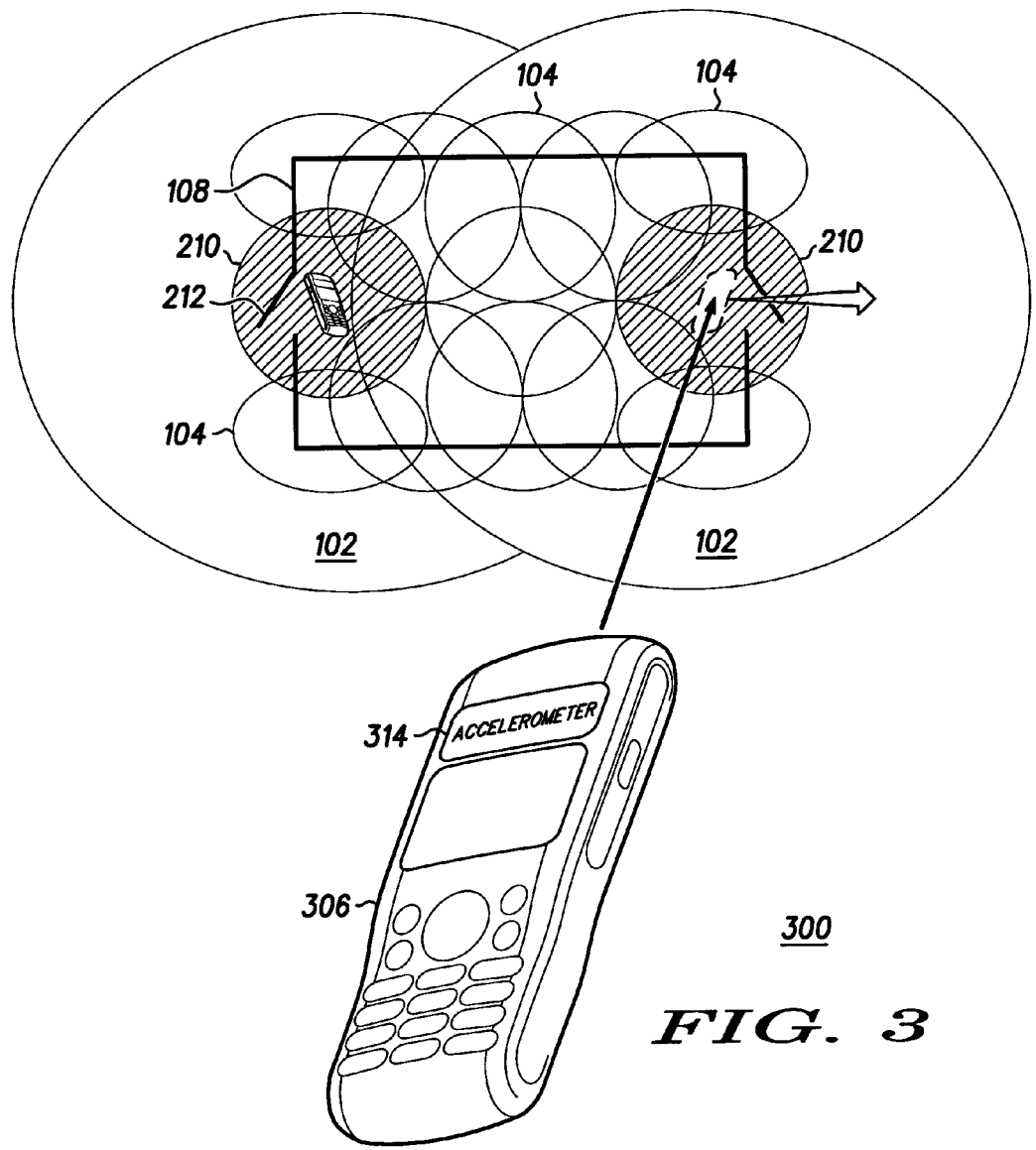
FIG. 3 is a block diagram illustrating a wireless communications system incorporating overlapping WAN cells, WLAN cells, border WLAN cells at building entry points, and movement-detecting mobile communication devices according to a preferred embodiment of the present invention.

Referring now to FIG. 3, a preferred embodiment of the present invention consists of overlapping WAN cells 102, with a concentration of overlapping WLAN cells 104 within a building 108 as shown. The WLAN cells 104 may be any of a number of different wireless protocols such as IEEE Standard 802.11 or Bluetooth. The mobile subscriber unit (SU) 306 contains a means for detecting movement of the SU 306 such as an accelerometer 314. Alternatively, the SU 306 may contain hardware for use with a Global Positioning System (GPS). While placing a call, the SU 306 uses the movement information from the accelerometer 314 in conjunction with knowledge that the SU 306 is detecting a WLAN border cell 210 to determine the most appropriate network for that call.

Figure 4:
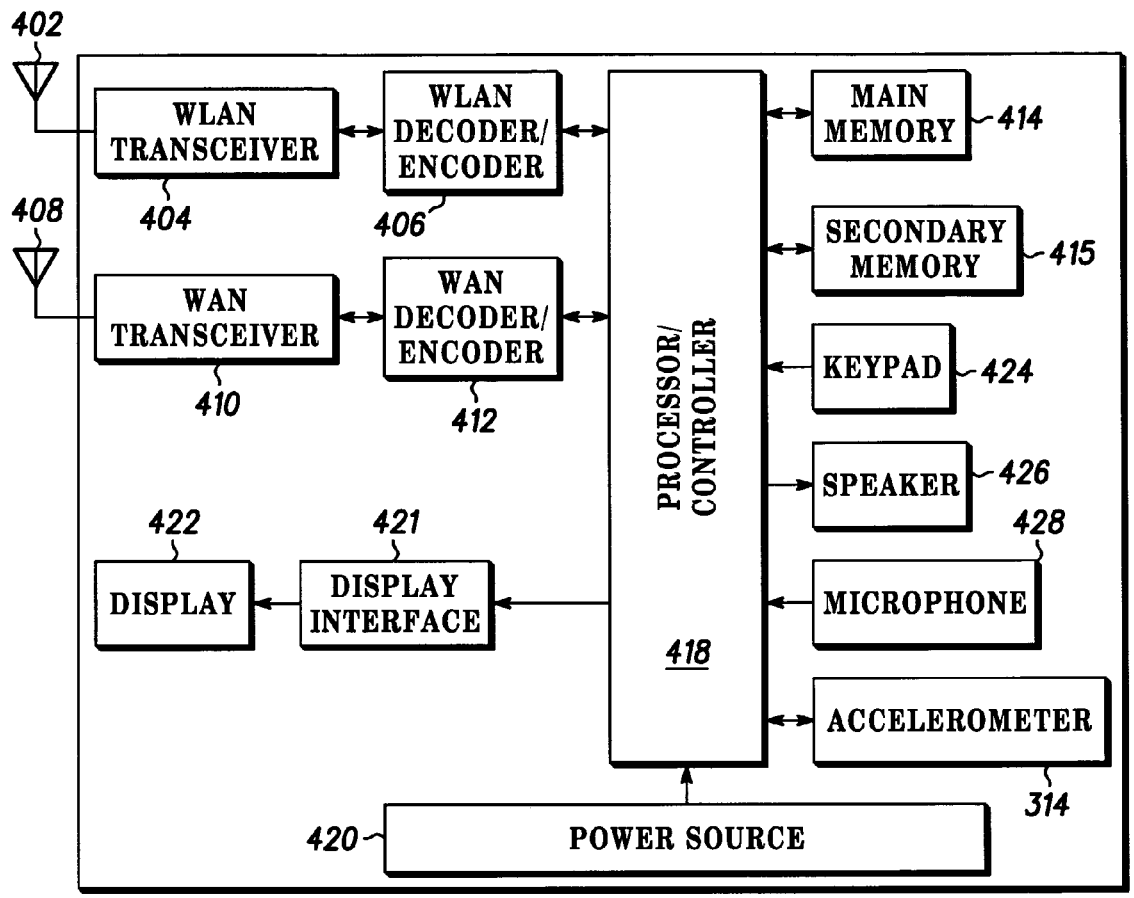
FIG. 4 is a block diagram illustrating a movement-detecting mobile communication device, i.e. a wireless device, of the system of FIG. 3 according to a preferred embodiment of the present invention.

A block diagram of an exemplary mobile subscriber device (SU) 306 is shown in FIG. 4. The SU 306 contains two sets of transceivers—one for the WLAN system and one for the WAN system, each transceiver containing an antenna 402, 408, an RF front end 404, 410, and a decoder/encoder 406, 412 respectively, designed to transmit, receive, encode and decode wireless signals for the frequencies and characteristics of its corresponding system. Wherever possible, the two antennas 402, 408, front ends 404, 410 and decoder/encoders 406, 412 could also be implemented with common, shared hardware and software.

Figure 5:
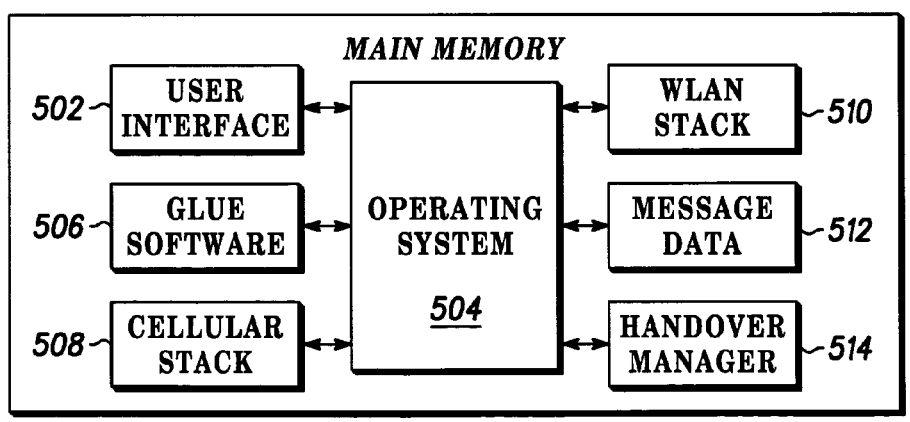
FIG. 5 is a block diagram illustrating the contents of an exemplary memory of a movement-detecting mobile communication device of the system of FIG. 3 according to a preferred embodiment of the present invention.

The mobile subscriber unit 306 also includes one or more processors 418 which processes instructions, performs calculations, and manages the flow of information through the SU 306. The SU 306 also includes a main memory 414 containing a program memory and a data memory, preferably random access memory (RAM), and may also include a secondary memory 415. Additionally, the processor 418 is communicatively coupled with the main memory 414. Included within the main memory 414, shown in more detail in FIG. 5, are a user interface 502, a handover manager 514 (to be discussed in more detail later), operating system platform 504, a cellular stack 508, a WLAN stack 510 and glue software 506. The operating system platform 504 manages resources, such as the message data 512 stored in data memory, the scheduling of tasks, and processes the operation of the cellular stack 508, the WLAN stack 510, and the handover manager 514 in the main memory 414.

The operating system platform 504 also manages a graphical and/or character-based display interface 421 (FIG. 4) that, according to the present example, is communicatively coupled to a display screen 422. Information is displayed to a user of the SU 306 via the screen 422, for visual output of information, and a speaker 426, for audible output. A user input interface 502 is communicatively coupled with a keypad 424 and a microphone 428 for receiving user input from a user of the SU 306. Additionally, the operating system platform 504 also manages many other basic tasks of the subscriber unit 306 in a manner well known to those of ordinary skill in the art.

Glue software 506 (FIG. 5) may include drivers, stacks, and low-level application programming interfaces (API's) and provides basic functional components for use by the operating system platform 504 and by compatible applications that run on the operating system platform 504 for managing communications with resources and processes in the subscriber unit 306.

Various software embodiments are described in terms of this exemplary computer system. After reading this description, it will become apparent to a person of ordinary skill in the relevant art(s) how to implement the invention using other computer systems and/or computer architectures.

The exemplary mobile subscriber unit 306 also contains a power source 420 for powering the device, such as a battery, DC adapter, or AC adapter. Please note that the power source 420 provides power to the entire mobile subscriber unit 306, however, for purposes of clarity, it is only shown connected to the processor/controller 418 in FIG. 4. This description should be obvious to those skilled in the art.

In alternative embodiments, the secondary memory 415 may include other similar means for allowing computer programs or other instructions to be loaded into the SU 306. Such means may include, for example, a removable storage unit and an interface (not shown). Examples of such may include a program cartridge and cartridge interface (such as that found in video game devices), a removable memory chip (such as an EPROM, or PROM) and associated socket, and other removable storage units and interfaces that allow software and data to be transferred from the removable storage unit to the SU 306.

In this document, the terms "computer program medium," "computer-usable medium," "machine-readable medium" and "computer-readable medium" are used to generally refer to media such as main memory 414 and secondary memory 415, removable storage drive, a hard disk installed in hard disk drive, and signals. These computer program products are means for providing software to the mobile subscriber unit 306. The computer-readable medium allows the SU 306 to read data, instructions, messages or message packets, and other computer-readable information from the computer-readable medium. The computer-readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer-readable medium may comprise computer-readable information in a transitory state medium such as a network link and/or a network interface, including a wired network or a wireless network, that allow a computer to read such computer-readable information.

Many devices, including some mobile subscriber devices and audio-visual remote controls, use piezo accelerometers to save power by waking up (e.g. activating the human interface) only when the device senses motion. Typically single axis accelerometers are used in combination with a threshold acceleration value that indicates the user intends to use the device. This is not sufficient for the WLAN case where it is necessary to determine if absolute movement of the device on a large scale is occurring, as opposed to moving the device a short distance from its previous location to the user's face. For example, for workers in the coverage area of WLAN border cells 210, when a call is started (which can be detected by a currently known approach) the SU 306 does not want to start the handover process unless the user starts to move a substantial distance away from his desk, as opposed to merely walking around his desk. A change in location, such as on the order of the distance defined by two or more workspace areas, preferably is detectable by the SU 306. Likewise, and perhaps more importantly, for individuals that tend to leave the building 108 for a break outside an entry-exit point 212 (the smoker scenario), the SU 306 would normally determine if gross movement has ceased. This avoids a more costly step (from a power and airtime perspective) of placing the inbound handover call on the WAN from the enterprise PBX.

According to a preferred embodiment, the addition of a 4-axis piezo accelerometer 314 (FIG. 3) in the SU 306 allows it to make intelligent call handover, call initiation and registration decisions (begin handover, and abort registration) based on whether or not the SU 306 is in gross translation to determine how far (and fast) the SU 306 is traveling when in a border cell 210. A 4-axis accelerometer 314 can be constructed to allow the computation of both translational and rotational movement. Normally the approach is to arrange 4 single axis devices along the lines originating from the center of a solid defined by a tetrahedron, that pass through the centroid of each of the tetrahedron's four triangular faces as shown in FIG. 6. Note that the distance of the individual single axis devices from the center of the tetrahedron are not required to be equal for all the single axis devices, and there are multiple orientations of the individual accelerometer's detection axis normal to the 4 axes defined by the tetrahedron that can be used. By knowing the relationships of the 4 devices in 3-space, the movement and rotation of the device can be accurately computed accounting for any differences in placement dictated by the physical envelop defined by the phone's housing. It should be noted that translational movement alone may be determined using a 3-axis accelerometer such as the commercially available LIS3L02, manufactured by STMicroelectronics. This single chip approach allows for a simpler integration into the mobile device 306 and should be sufficient for determining gross movement or displacement in most instances. The four-axis tetrahedron arrangement and a three-axis cube arrangement are both shown for comparison in FIG. 6.

Figure 8:
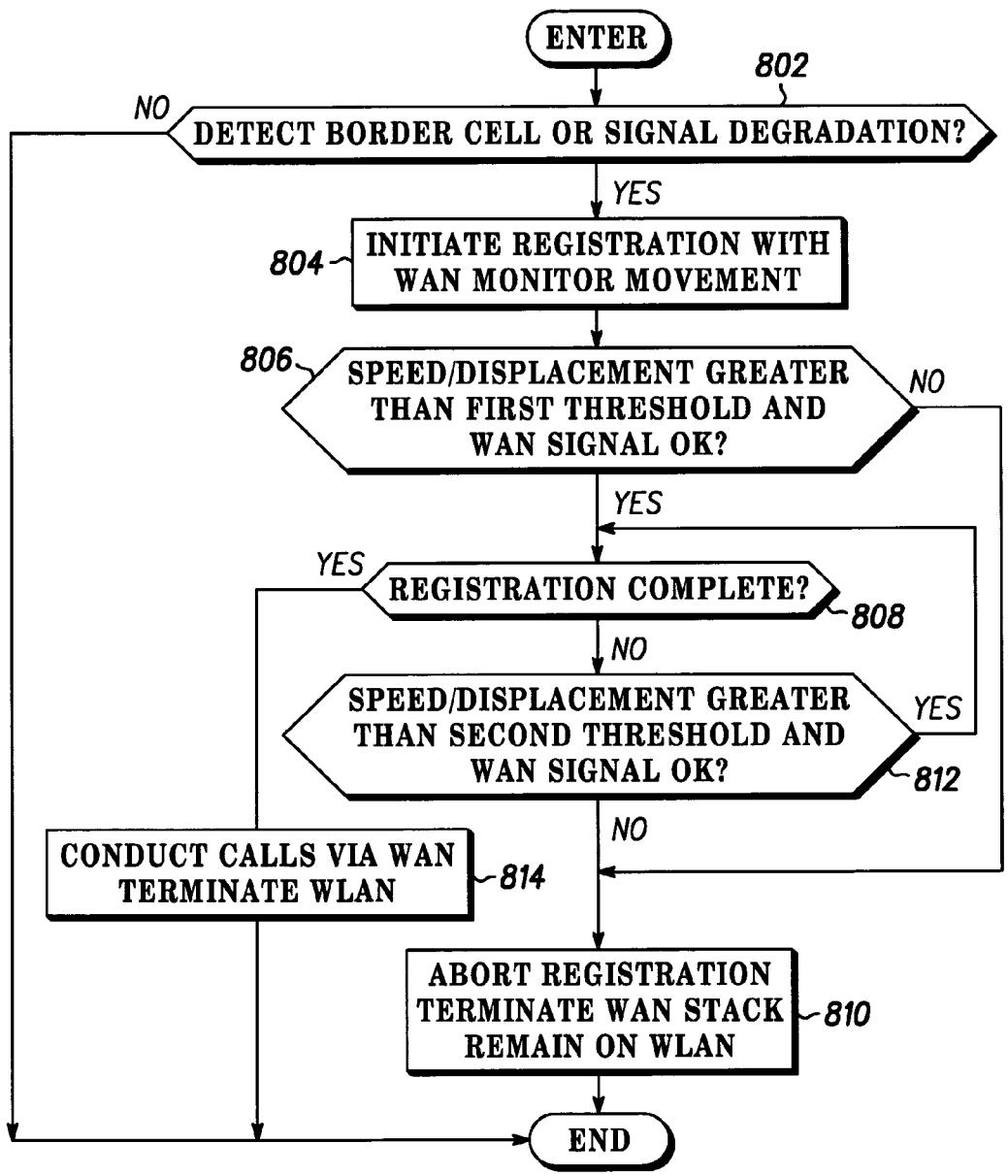
Figure 9:
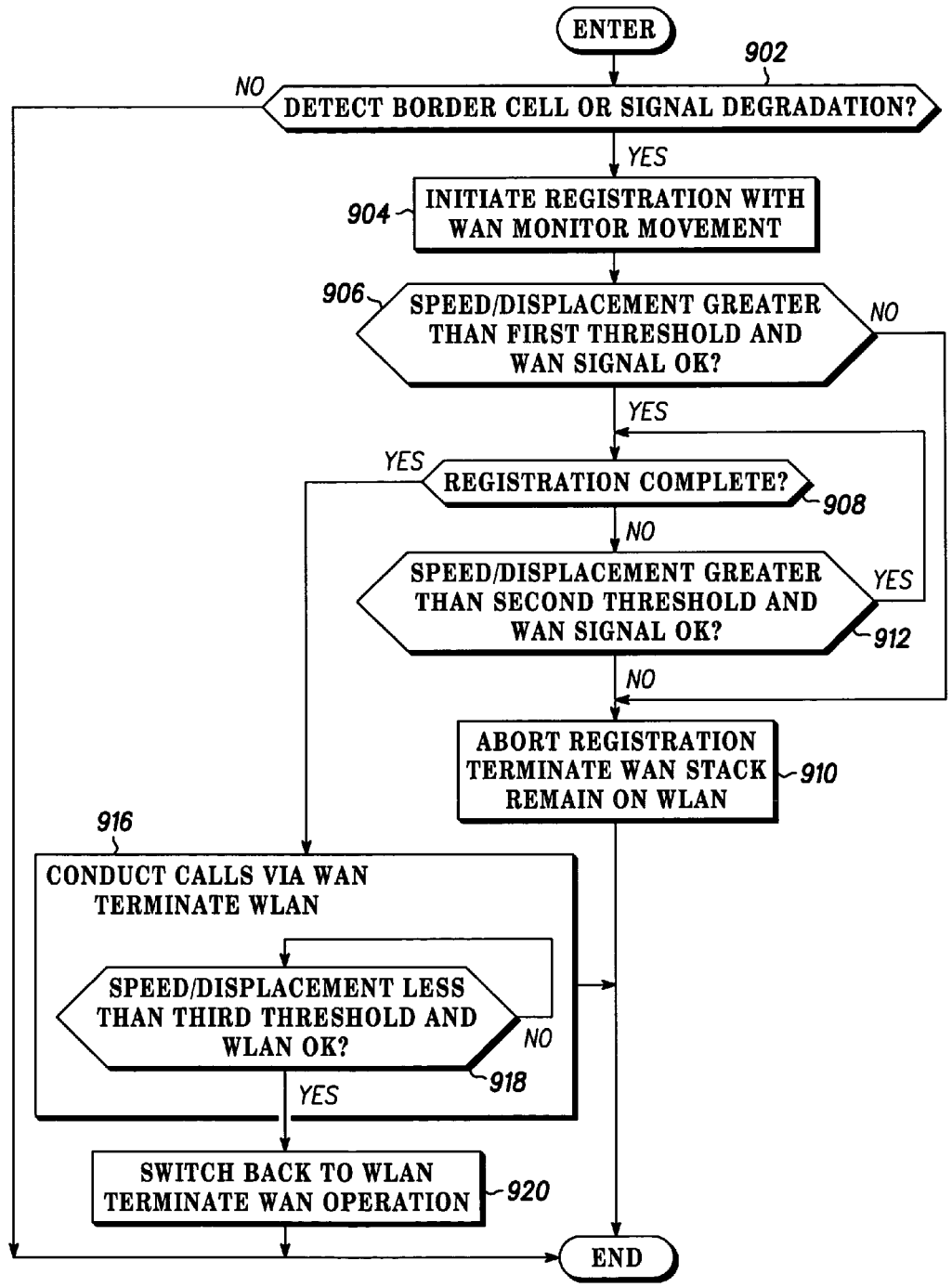
Figure 10:
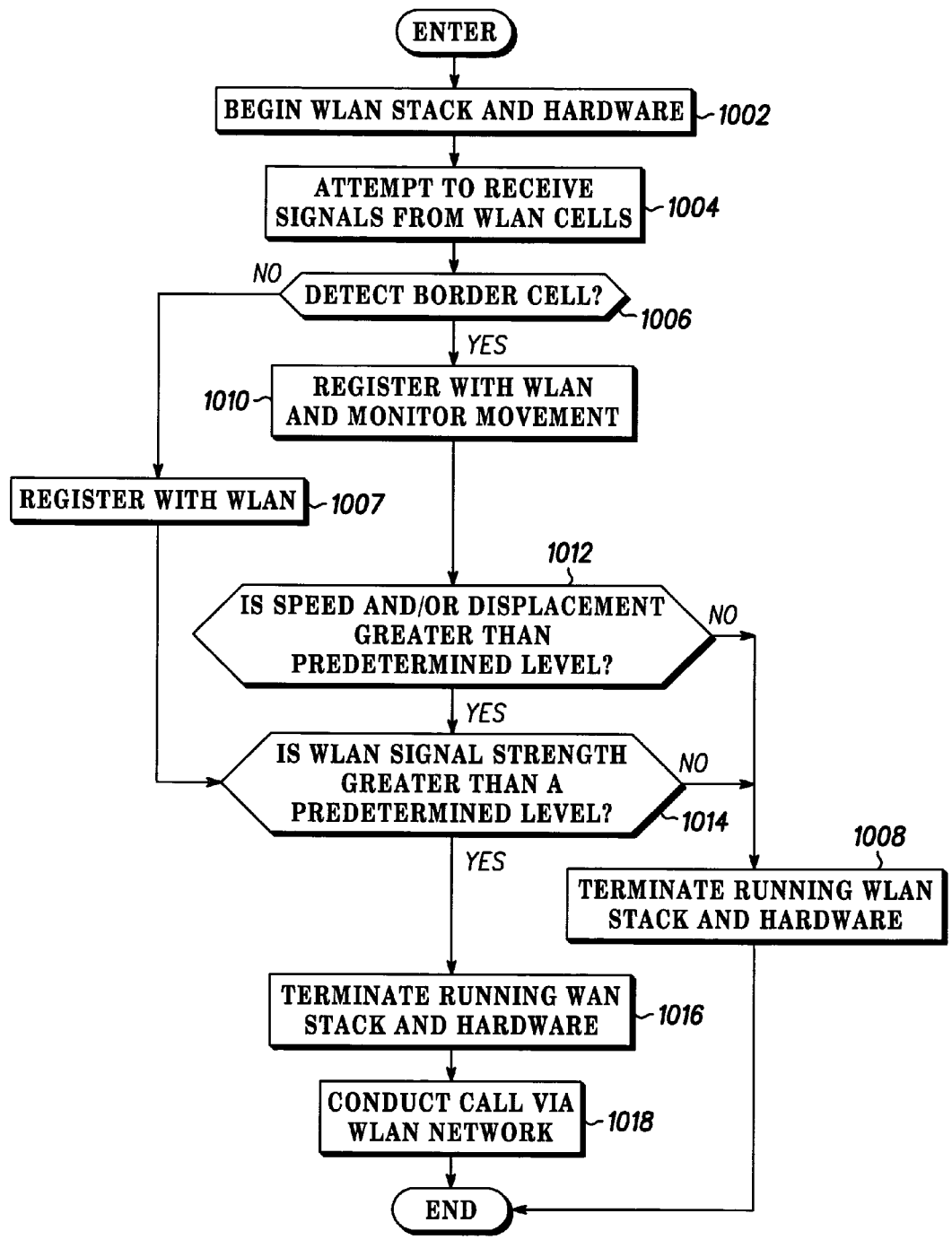

FIGS. 7, 8, 9, 10 and 11 are exemplary operational flow diagrams of the system of FIG. 3. FIGS. 7-9 and 11 outline the steps necessary for moving from an area of WLAN coverage to that of WAN coverage. FIG. 10 illustrates a method for moving from WAN coverage into WLAN coverage.

In FIG. 7, a preferred method is triggered at step 702 when the handover manager 514 (FIG. 5) detects the presence of a WLAN border cell 210, or a degradation in signal quality of the WLAN coverage. It is important to note at this time that the unit 306 will execute this routine periodically when a call is not in progress, and will increase the frequency of running this routine during a call. At step 704, the unit has detected the border cell 210 or WLAN signal degradation and initiates registration with the WAN system. The subscriber unit 306 then begins to monitor the movement of the device 306, at step 706, by computing the relative location of the phone over time from acceleration information. For example, walking around one's office would not constitute gross movement, while moving a distance equivalent to a number of workspaces would. This information may be obtained from an accelerometer 314, or alternatively, from a GPS chipset. If the speed and/or displacement information exceeds a predetermined threshold, at step 708, then the present or subsequent calls are conducted via the WAN system, at step 710. The unit 306 may then terminate running the WLAN stack and hardware, at step 712, thereby saving battery life. If the speed and/or displacement information does not exceed a predetermined threshold, at step 708, the unit 306 exits the process and continues to conduct the present or subsequent calls via the WLAN system.

The process illustrated in FIG. 8 further expands upon the method of the handover manager 514 presented in FIG. 7. Again, the subscriber unit 306 attempts to detect the presence of a border cell 210 or degradation in signal quality of the WLAN coverage at step 802. If the border cell 210 or WLAN signal degradation is detected, then the unit 306 initiates the registration sequence with the WAN system and begins to monitor the movement of the device 306, at step 804. Note that hereafter, the process of initiating the registration sequence with a communications system, be it a cellular (WAN) system or a local area (WLAN) system, includes the steps necessary to bring up the corresponding hardware and software for that system. In this example, if either the speed and/or displacement of the device 306 do not exceed a first predetermined threshold or the strength of the WAN signal is unacceptable, at step 806, then the registration sequence is aborted (the unit stops running the WAN stack 510 and hardware 410, 412) at step 810 and the process is exited, resulting in a current and/or future calls continuing to be placed via the WLAN system. However, if the speed and/or displacement of the device 306 do exceed the first predetermined threshold and the signal strength of the WAN signal is still good, at step 806, then the device checks to see if the registration sequence has been completed, at step 808. If the registration sequence has not completed, the unit will continue to monitor the speed and/or displacement of the device and the strength of the WAN signal while checking whether the registration is completed, at step 812, and will abort, at step 810, at any time during the registration sequence if the speed and/or displacement of the device 306 do not exceed a second predetermined threshold or the signal strength of the WLAN falls below a predetermined level. When the registration sequence is completed, the unit will conduct any present call and subsequent calls via the WAN system, at step 814, and will terminate running the WLAN stack 510 and hardware 404, 406. This method saves battery life by both aborting the handover to the WAN when unnecessary, and terminating the WLAN stack and hardware when the call is transferred to the WAN system.

The method described in the previous paragraph is again expanded upon in FIG. 9. Again, the subscriber unit 306 attempts to detect the presence of a border cell 210 or a degradation in signal quality of the WLAN coverage, at step 902. If the border cell 210 or WLAN signal degradation is detected, then the unit 306 initiates the registration sequence with the WAN system, at step 904, begins to monitor the movement of the device 306. If the speed and/or displacement of the device 306 do not exceed a first predetermined threshold or the strength of the WAN signal falls below an accepted level, at step 906, then the initiation of registration is aborted, at step 910, and the WAN stack and hardware are terminated, ending the process and resulting in any present and/or subsequent call being conducted via the WLAN. If the speed and/or displacement of the device 306 do exceed the predetermined threshold and the WAN signal is at an acceptable level at step 906, then the device checks to see if the registration sequence has been completed, at step 908. The unit will continue to monitor the movement of the wireless device 306 until the registration is completed and will abort (proceed to step 910) at any time during the registration sequence if the speed and/or displacement of the device 306 do not exceed a second predetermined threshold or the WAN signal strength is unacceptable, at step 912. After the registration sequence has ended, at step 908, the unit 306 will conduct any present and/or subsequent calls via the WAN system, at step 916, and also terminates running the WLAN stack 510 and hardware 404, 406.

The unit 306 will continue to perform one or more checks of the movement at step 918. If the speed and/or displacement of the device 306 is less than a third predetermined threshold and the WLAN coverage is acceptable, at step 918, the unit deregisters from the WAN and stops running the WAN stack 510 and hardware 410, 412, at step 920, and the process ends. This method provides the battery saving features of the previously described procedures, but provides more certainty that the device 306 is actually moving through the border cell away from the WLAN coverage and that the user is not taking a breaks near an entryway (e.g. smoking near exits in WLAN coverage areas 104).

Alternative methods may include monitoring the speed and displacement of the device before initiating the WAN registration process, and beginning the sequence only if the speed and/or displacement exceed the predetermined thresholds. This presents further benefits to the phone battery life and the WAN system demands in that the unit 306 does not even start the WAN stack 510 and hardware 410, 412, or burden the WAN system unnecessarily until sufficient movement has been detected.

Figure 11:
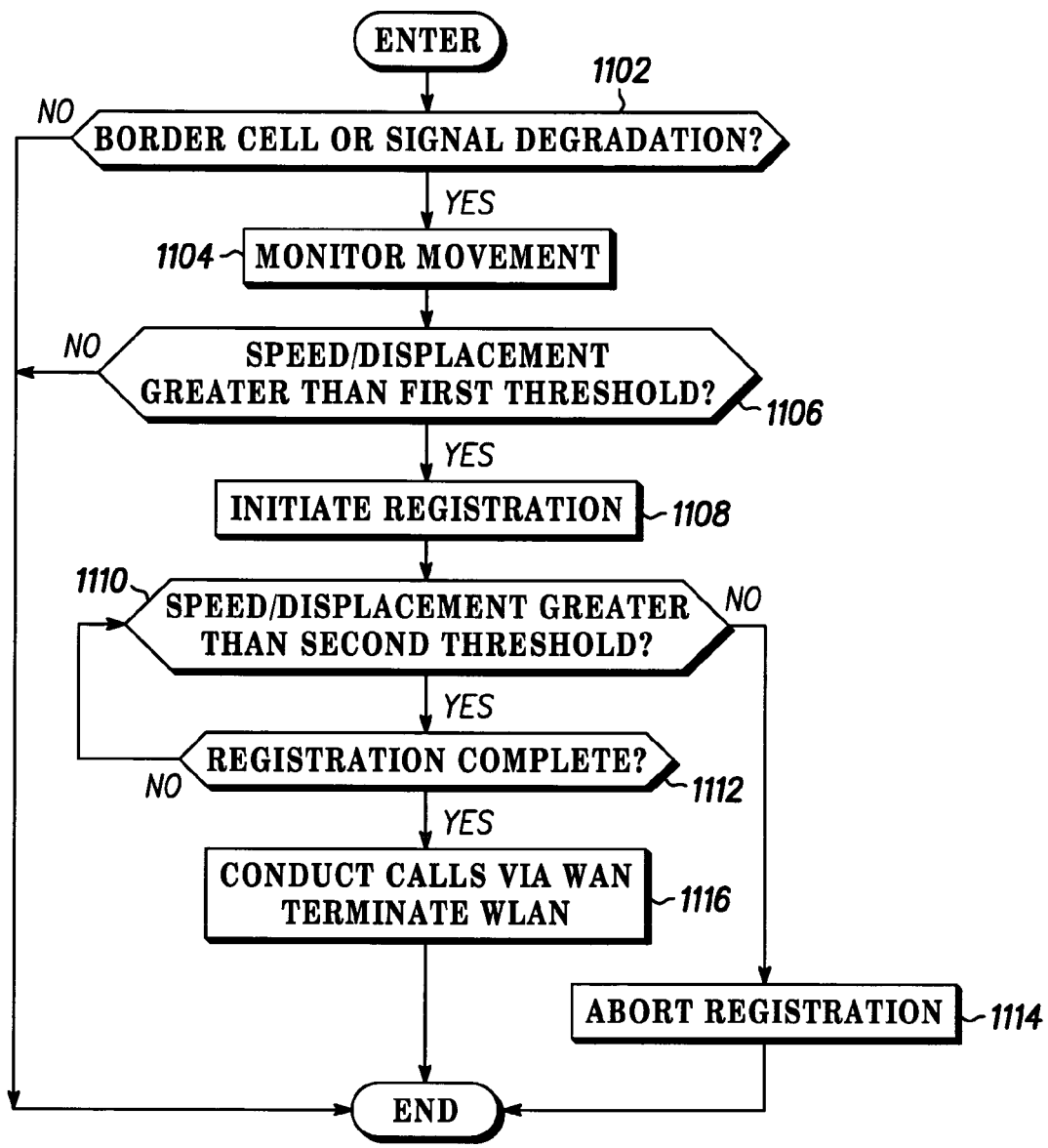

The operational flow diagram of FIG. 11 illustrates an alternative embodiment in which initiating the WAN registration process, and beginning the sequence occurs only if the speed and/or displacement exceed the predetermined thresholds. The subscriber unit 306 attempts to detect a trigger, at step 1102, such as the presence of a border cell 210, or a degradation in signal quality of the WLAN coverage. If triggering event is detected, then the unit 306 monitors the movement of the device 306, at step 1104. If the speed or displacement does not exceed a first predetermined threshold, at step 1106, the process ends without ever having to bring up the WAN stack and hardware. Otherwise, the unit 306 initiates the registration sequence, at step 1108. The unit 306 continues to monitor the movement and if at any time during the registration procedure the speed or displacement is below a second predetermined threshold, at step 1110, then the registration sequence is aborted, at step 1114. When the registration sequence has finished ("yes" path out of step 1112), the unit 306 switches to the WAN network and any present or subsequent calls are conducted via the WAN, at step 1116. The unit 306 also terminates the WLAN stack and hardware.

In yet another alternative embodiment, the steps 1102 and 1106 in FIG. 11 are performed in a slightly different order. In this embodiment, the unit 306 continuously monitors the speed or displacement of the unit 306, at step 1104. Only if the speed or displacement exceeds a first predetermined threshold, at step 1106, does the unit 306 attempts to detect a trigger, at step 1102, such as the presence of a border cell 210, or a degradation in signal quality of the WLAN coverage. If a trigger is detected, the unit 306 initiates a registration with the WAN, at step 1108, and continues the operational flow described above.

Prior art methods may be used in conjunction with the present invention to provide hysteresis to avoid a condition in which a wireless device 306 keeps switching back and forth between the WAN and WLAN. This includes the use of multiple thresholds, as shown in FIG. 8 and FIG. 10 and the use of timers that force the wireless device 306 to stay registered with a first system for a minimum duration before it is allowed to switch to a second one (provided there is coverage from the first system).

FIG. 10 illustrates a procedure used by the subscriber device 306 when moving from WAN coverage to WLAN coverage. From time to time, while on the WAN network, the unit 306 will execute this process in order to check for coverage of the WLAN system. As with the previously described methods, this process will run more often during a call than when idle (not on a call). The unit 306 enters the method, at step 1002 where it begins running the WLAN stack 510 and its associated hardware 404, 406. The unit then attempts to receive signals from WLAN cells at step 1004. If the unit detects a WLAN border cell, at step 1006, then the unit 306 registers with the WLAN and begins to monitor its movement, at step 1010. Otherwise, if the unit 306 determines that the unit is within a normal WLAN cell 104, the unit will immediately register with the WLAN, at step 1007, and begin to handover any current call(s) to the WLAN system, (i.e. the unit will bypass the steps for checking the movement and skip ahead to step 1014). For a unit 306 that detects a border cell, if the speed and/or displacement exceed predetermined thresholds, at step 1012, then the unit will check the signal strength of the WLAN signal, at step 1014. Otherwise, the unit 306 again terminates running the WLAN stack 510 and hardware 404, 406, at step 1008, if either the movement information or the WLAN signal strength is insufficient to warrant a handover. If all the conditions are met (i.e. sufficient signal strength, necessary movement conditions within border cell coverage) then the unit 306 will terminate running the WAN stack 508 and hardware 410, 412, at step 1016, and conducts any present and/or subsequent calls via the WLAN system, at step 1018.

The present invention can be realized in hardware, software, or a combination of hardware and software. An embodiment of the present invention can also be embedded in a computer program product, which comprises all the features enabling the implementation of the methods described herein, and which, when loaded in a computer system, is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer-readable medium, allowing a computer system, to read data, instructions, messages or message packets, and other computer-readable information from the computer-readable medium. The computer-readable medium may include non-volatile memory, such as ROM, Flash memory, Disk drive memory, CD-ROM, and other permanent storage. Additionally, a computer-readable medium may include, for example, volatile storage such as RAM, buffers, cache memory, and network circuits. Furthermore, the computer-readable medium may comprise computer-readable information in a transitory state medium such as a network link and/or a network interface, including a wired network or a wireless network, that allow a computer system to read such computer-readable information.

Computer programs (also called computer control logic) are stored in main memory 414 and/or secondary memory. Computer programs may also be received "over-the-air" via one or more wireless receivers. Such computer programs, when executed, enable the subscriber unit 306 to perform the advantageous features of the present invention as discussed herein. In particular, the computer programs, when executed, enable the processor 418 to perform the features of the subscriber unit 306. Accordingly, such computer programs represent controllers of the subscriber unit 306.

The novel system and related methods for improving WLAN handover behavior and phone battery life provide significant advantages for dual-mode cellular communication systems (WLAN/WAN systems), such as improving the reliability of the handover, thereby allowing for significant cost savings by allowing more calls to be made over the WLAN. The WAN system will no longer be burdened with the unnecessary load of placing calls for users that remain within the WLAN coverage even though they are using the border cells. Users who work or are inside WLAN border cells for significant periods of time will especially benefit from the novel system and methods of the present invention. The actual phone will benefit from improved battery life for these users as it decreases the time required for the units to run the hardware and software for each system simultaneously. Since portable wireless devices, cellular telephones, and two-Way radios, are incorporating motion detecting devices more frequently, these types of devices will particularly benefit from the preferred embodiments of the present invention as has been discussed above.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A mobile communication device comprising:
   at least two transceivers, each transceiver designed to operate on a separate wireless communications system, for transmitting and receiving wireless information;
   a controller, communicatively coupled to each transceiver, for managing the operation of the mobile communication device;
   a first wireless communications system stack, communicatively coupled to the controller, having instructions for communicating according to its respective protocol;
   a second wireless communications system stack, communicatively coupled to the controller, having instructions for communicating according to its respective protocol;
   a means for measuring speed or displacement of the wireless device, communicatively coupled to the controller; and
   a handover manager, communicatively coupled to the controller, the first wireless communications system stack, the second wireless communications system stack, and the means for measuring speed or displacement of the wireless device, the handover manager for determining when to handover from the first wireless communication system to the second wireless communication system in response to determining that a speed or displacement of the device exceeds a first predetermined threshold, wherein a handover manager aborts a registration sequence with the second wireless communication system in response to determining that a speed or displacement of the wireless device does not exceed a second predetermined threshold.

2. The device of claim 1, wherein the means for measuring speed or displacement of the device comprises an accelerometer detecting means or a global positioning system detecting means.

3. The device of claim 1, wherein the handover manager, if a registration sequence with the second wireless communication system is completed, deregisters the wireless device from the second wireless communication system in response to determining that a weed or displacement of the wireless device does not exceed the second predetermined threshold.

4. A mobile communication system comprising:

at least one cell of a wireless local area network communications system, the at least one cell providing communication coverage within a structure having at least one egress point;

at least one coverage cell of a second communications system, overlapping the at least one cell of a wireless local area network, for providing communication coverage outside the structure;

at least one border cell of a wireless local area network communications system, the border cell located at the egress point of the structure, providing a transition area from the wireless local area network communications system and the second communications system; and at least one mobile subscriber device, communicatively coupled with the at least one cell of the wireless local area network communications system, the at least one coverage cell of the second communications system, and the at least one border cell of a wireless local area network communications system, the at least one mobile subscriber device determining when to handover from one wireless communication system to the second wireless communication system in response to determining that a speed or displacement of the device exceeds a predetermined threshold, wherein the handover manager aborts a registration sequence with the second wireless communication system in response to determining that a speed or displacement of the wireless device does not exceed a second predetermined threshold.

* * * * *